(12) United States Patent
Chang (10) Patent No.: US 9,731,364 B2
(45) Date of Patent: Aug. 15, 2017

(54) THREE PART SLIDE AND LOCKING MECHANISM FOR USE WITH A TABLE SAW

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 119 days.

(21) Appl. No.: 14/674,351

(22) Filed: Mar. 31, 2015

(65) Prior Publication Data

US 2016/0288361 A1    Oct. 6, 2016

(51) Int. Cl.
| | | |
|---|---|---|
| *B26D 1/18* | (2006.01) | |
| *B27B 27/04* | (2006.01) | |
| *B27B 3/28* | (2006.01) | |
| *B27C 1/00* | (2006.01) | |
| *B23D 47/02* | (2006.01) | |

(52) U.S. Cl.
CPC .................. *B23D 47/025* (2013.01)

(58) Field of Classification Search
CPC ....................................................... B27G 19/02
USPC .......... 83/47.3, 477.2, 438, 468, 440.2, 485; 144/154.5, 136.95, 286.5, 287; 108/69
See application file for complete search history.

(56) References Cited

U.S. PATENT DOCUMENTS

| | | | | |
|---|---|---|---|---|
| 2,872,261 A * | 2/1959 | Dobbratz | ................. | A47B 1/10 384/17 |
| 3,685,872 A * | 8/1972 | Babbs | ................. | B60N 2/0715 248/430 |
| 4,194,793 A * | 3/1980 | Offermans | ............. | A47B 88/10 16/88 |
| 4,204,658 A * | 5/1980 | Courtois | ............. | B60N 2/0705 248/430 |
| 4,262,963 A * | 4/1981 | Bauer | ..................... | B60N 2/072 248/429 |
| 4,751,865 A * | 6/1988 | Buckalew | ................ | B23Q 1/40 83/486.1 |
| 4,760,988 A * | 8/1988 | Bianchi | ................ | B60N 2/0707 248/420 |
| 5,421,231 A * | 6/1995 | Break | .................. | B23D 45/024 108/13 |
| 6,189,429 B1 * | 2/2001 | Liu | ....................... | B23D 47/025 108/143 |
| 6,293,176 B1 * | 9/2001 | Talesky | ................ | B23D 47/025 144/286.1 |
| 6,375,290 B1 * | 4/2002 | Lin | ......................... | A47B 88/08 312/334.44 |
| 6,484,614 B1 * | 11/2002 | Huang | ................. | B23D 47/025 269/318 |

(Continued)

*Primary Examiner* — Ghassem Alie
*Assistant Examiner* — Bharat C Patel (57) ABSTRACT

A table saw is provided with a table assembly including an upper cutting surface having a front edge and a rear edge; a slide assembly including, at each of the front edge and the rear edge, an inner slide member, an intermediate slide member slidably journalled in the inner slide member, and an outer slide member slidably journalled in the intermediate slide member wherein the intermediate slide member includes a pin moveably disposed in an elongated slot of the outer slide member; and a lock assembly under the upper cutting surface and including a lever, a cam at a distal end of the lever, and a spring biased two part rod wherein the cam is pivotably disposed between two parts of the rod. In response to a clockwise turning of the lever and the cam the biasing member expands to unlock the slide assembly.

1 Claim, 16 Drawing Sheets

(56) References Cited

U.S. PATENT DOCUMENTS

| | | | | |
|---|---|---|---|---|
| 6,736,042 B2* | 5/2004 | Behne | B23D 45/068 | 83/440.2 |
| 6,986,370 B1* | 1/2006 | Schoene | B23D 45/062 | 108/102 |
| 7,059,370 B2* | 6/2006 | Wang | F16C 33/61 | 108/143 |
| 7,240,706 B2* | 7/2007 | Liu | B23D 47/025 | 108/143 |
| 7,441,487 B2* | 10/2008 | Liu | B23D 47/025 | 83/438 |
| 7,444,945 B2* | 11/2008 | Wang | B23D 47/025 | 108/143 |
| 7,490,643 B2* | 2/2009 | Liu | B23D 47/025 | 108/143 |
| 7,497,239 B2* | 3/2009 | Smith | B23D 47/025 | 144/286.5 |
| 7,930,960 B2* | 4/2011 | Duginske | B23Q 3/007 | 144/253.1 |
| 8,132,875 B2* | 3/2012 | Juang | A47B 88/08 | 312/333 |
| 8,297,723 B2* | 10/2012 | Chen | E05B 65/463 | 312/221 |
| 8,403,433 B2* | 3/2013 | Chen | A47B 88/044 | 312/333 |
| 8,616,104 B2* | 12/2013 | Frolov | B23D 47/02 | 83/471 |
| 9,055,815 B2* | 6/2015 | Chiu | A47B 88/16 | |
| 9,145,070 B2* | 9/2015 | Hayashi | B60N 2/0705 | |
| 9,302,371 B2* | 4/2016 | Chen | B25B 11/00 | |
| 9,313,914 B2* | 4/2016 | Judge | H05K 7/1489 | |
| 2013/0058596 A1* | 3/2013 | Chen | A47B 88/14 | 384/7 |
| 2013/0058598 A1* | 3/2013 | Chang | F16C 29/005 | 384/41 |
| 2013/0269574 A1* | 10/2013 | Cooper | A47B 1/05 | 108/69 |
| 2014/0265102 A1* | 9/2014 | Frolov | B23D 47/025 | 269/309 |

* cited by examiner

THREE PART SLIDE AND LOCKING MECHANISM FOR USE WITH A TABLE SAW

BACKGROUND OF THE INVENTION

1. Field of the Invention

The invention relates to table saws and in particular to a table saw including a slide assembly having inner, intermediate, and outer slide members, and a locking mechanism for, for example, unlocking the slide assembly so that both the intermediate and outer slide members can move relative to the inner slide member for expanding the upper cutting surface.

2. Description of Related Art

Typically, a table saw include a frame and an upper surface having an opening through which a blade extends. The upper surface supports a material (e.g., wood) which is pushed for cutting by the blade. Because most table saws are used in large open spaces, the dimensions of the table saw can be large enough to support materials of various sizes. Thus, numerous means to expand the cutting surface are disclosed. For example, one method includes separate auxiliary surfaces that are secured to the side of the cutting surface.

Some typical table saws are configured with rails that are attached to the front and rear edge surfaces of the upper surface. These rails extend beyond one side end of the table saw. An auxiliary table surface can be movably attached to the rails so that the auxiliary table may move along the rails between a first position adjacent the upper surface of the table saw and a second position at the ends of the rails.

However, the extent of expanding cutting surface by mounting rails is limited. Thus, it is not configured to cut some large materials. Further, the rail based cutting surface expansion mechanism is not durable and reliable in use.

Thus, the need for improvement still exists.

SUMMARY OF THE INVENTION

It is therefore one object of the invention to provide a table saw comprising a table assembly mounted on a frame and including an upper cutting surface through which a blade extends to cut a material, the upper cutting surface having a front edge and a rear edge extending between a first side and a second side; and an auxiliary table at one side of the upper cutting surface; and a slide assembly including, at each of the front edge and the rear edge of the upper cutting surface, an inner slide member, an intermediate slide member slidably journalled in the inner slide member, and an outer slide member slidably journalled in the intermediate slide member wherein the outer slide member has one end secured to the auxiliary table.

The above and other objects, features and advantages of the invention will become apparent from the following detailed description taken with the accompanying drawings.

DETAILED DESCRIPTION OF THE INVENTION

Referring to FIGS. 1 to 13, a wheeled table saw 10 in accordance with the invention comprises the following components as discussed in detail below.

Figure 1:
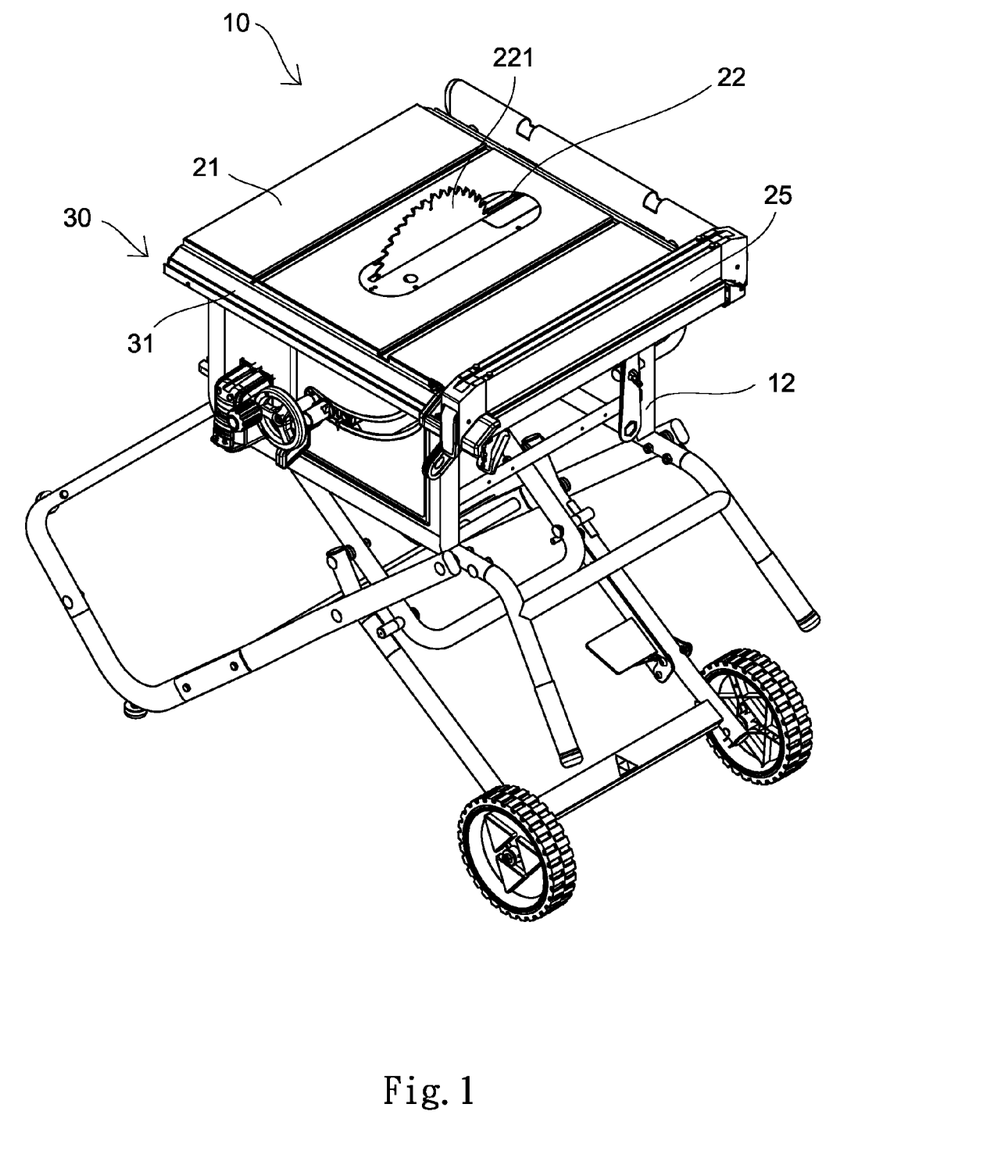
FIG. 1 is a perspective view of a wheeled table saw according to the invention.
Figure 2:
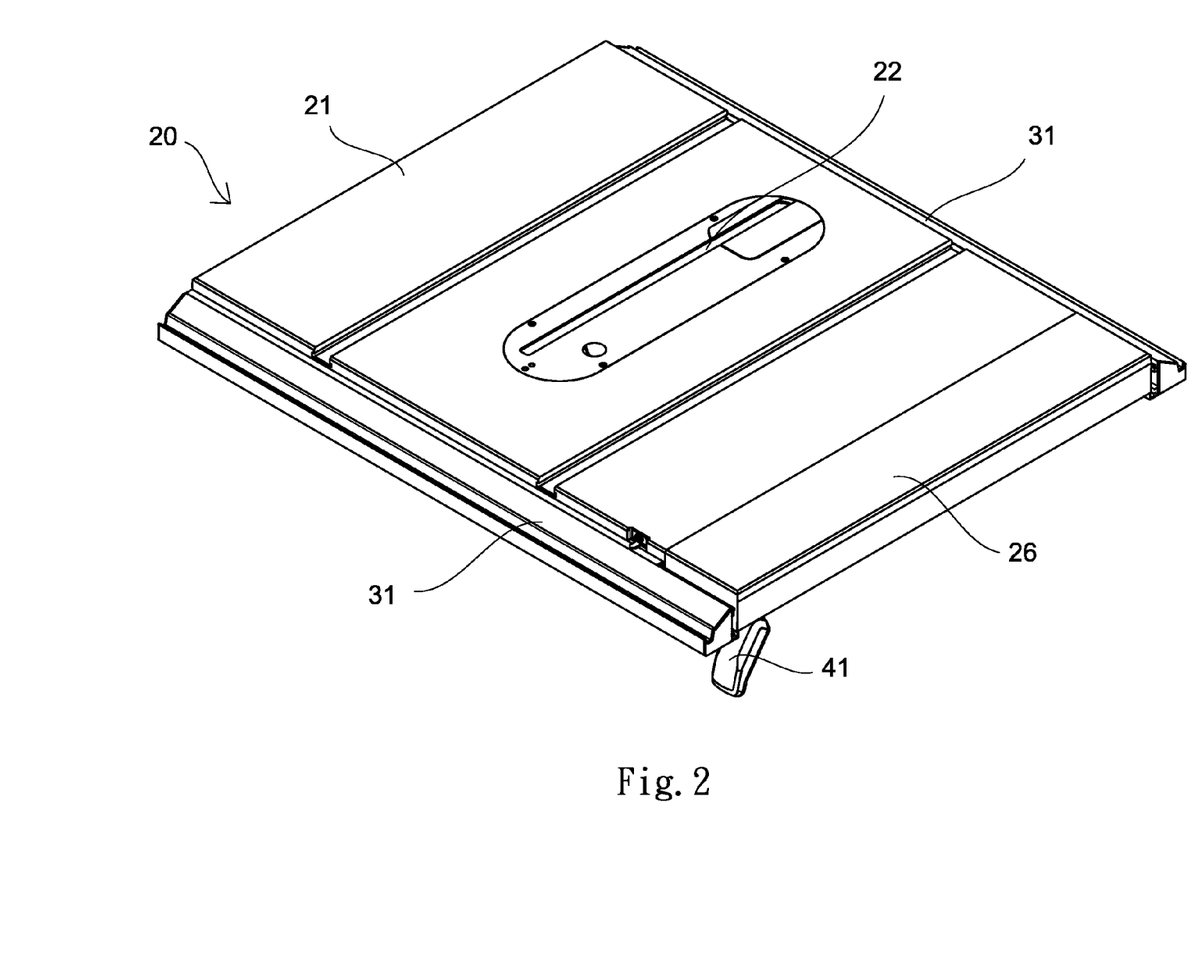
FIG. 2 is a perspective view of the upper cutting surface and the slide assembly viewing from above.
Figure 3:
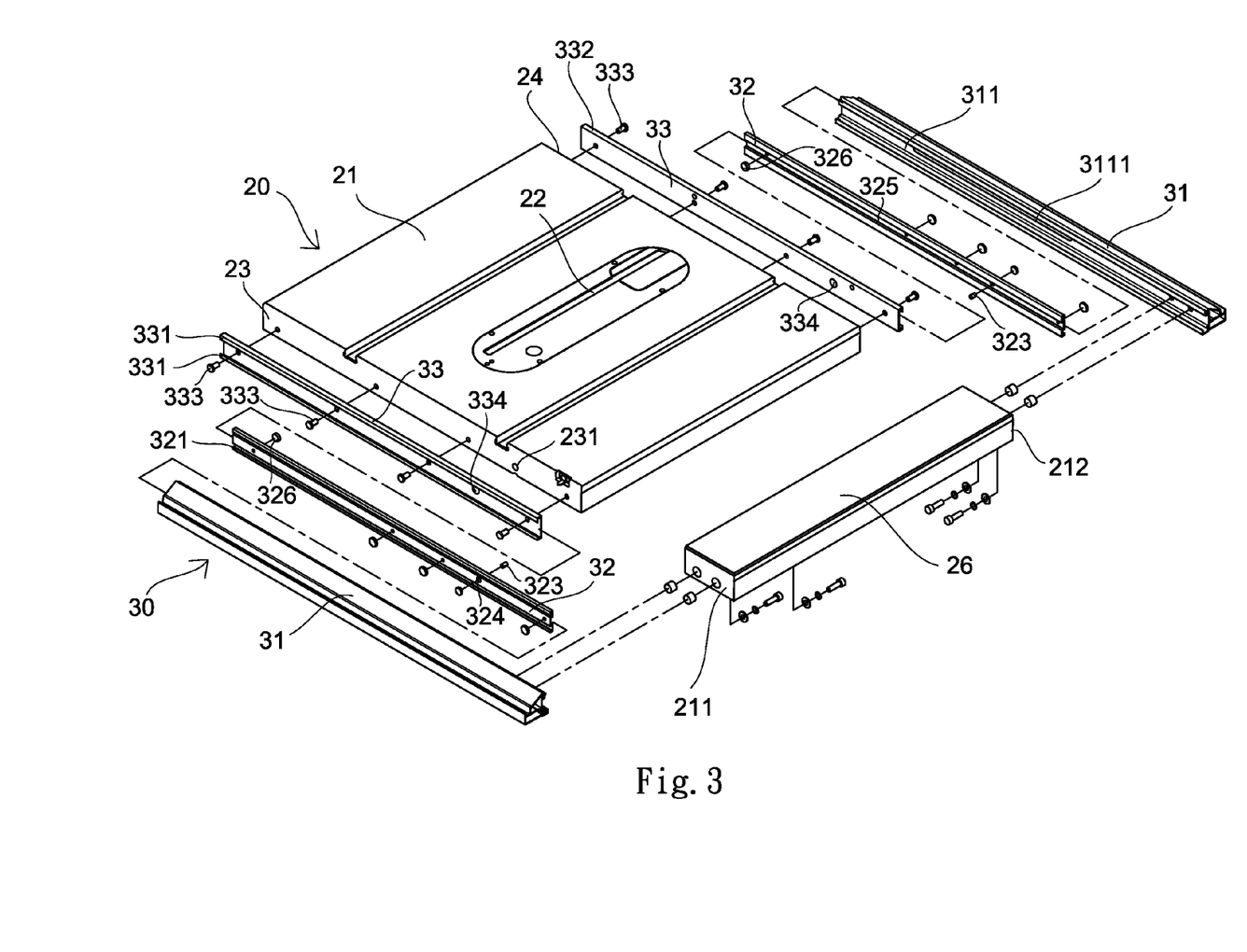
FIG. 3 is an exploded view of FIG. 2.
Figure 4:
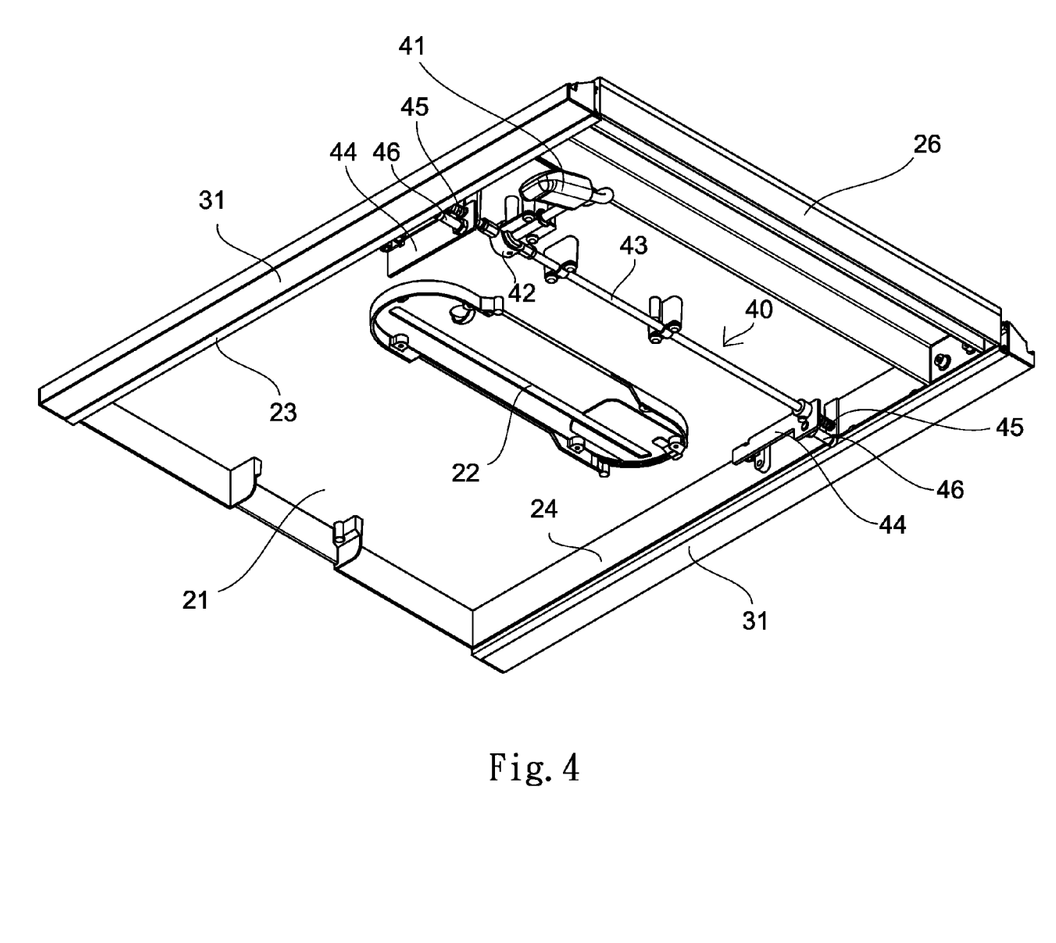
FIG. 4 is another perspective view of the upper cutting surface and the slide assembly but viewing from below.
Figure 5:
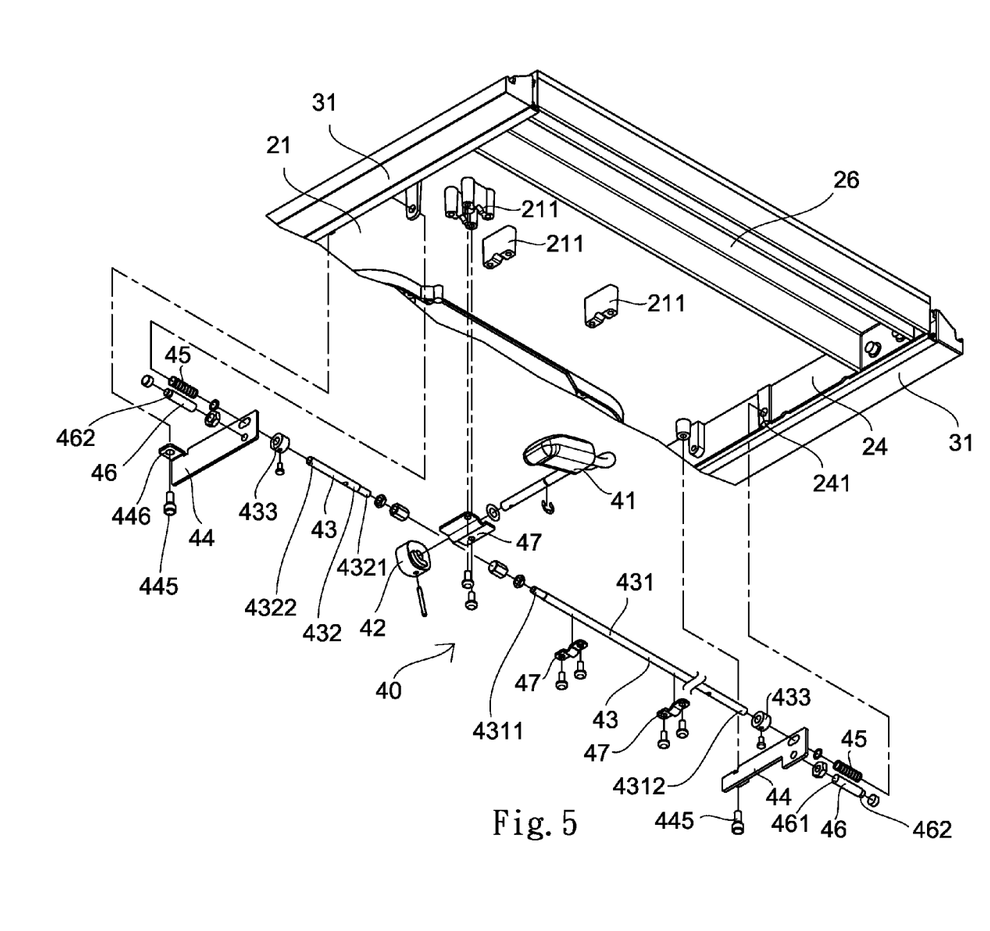
FIG. 5 is an exploded view of FIG. 4.
Figure 6:
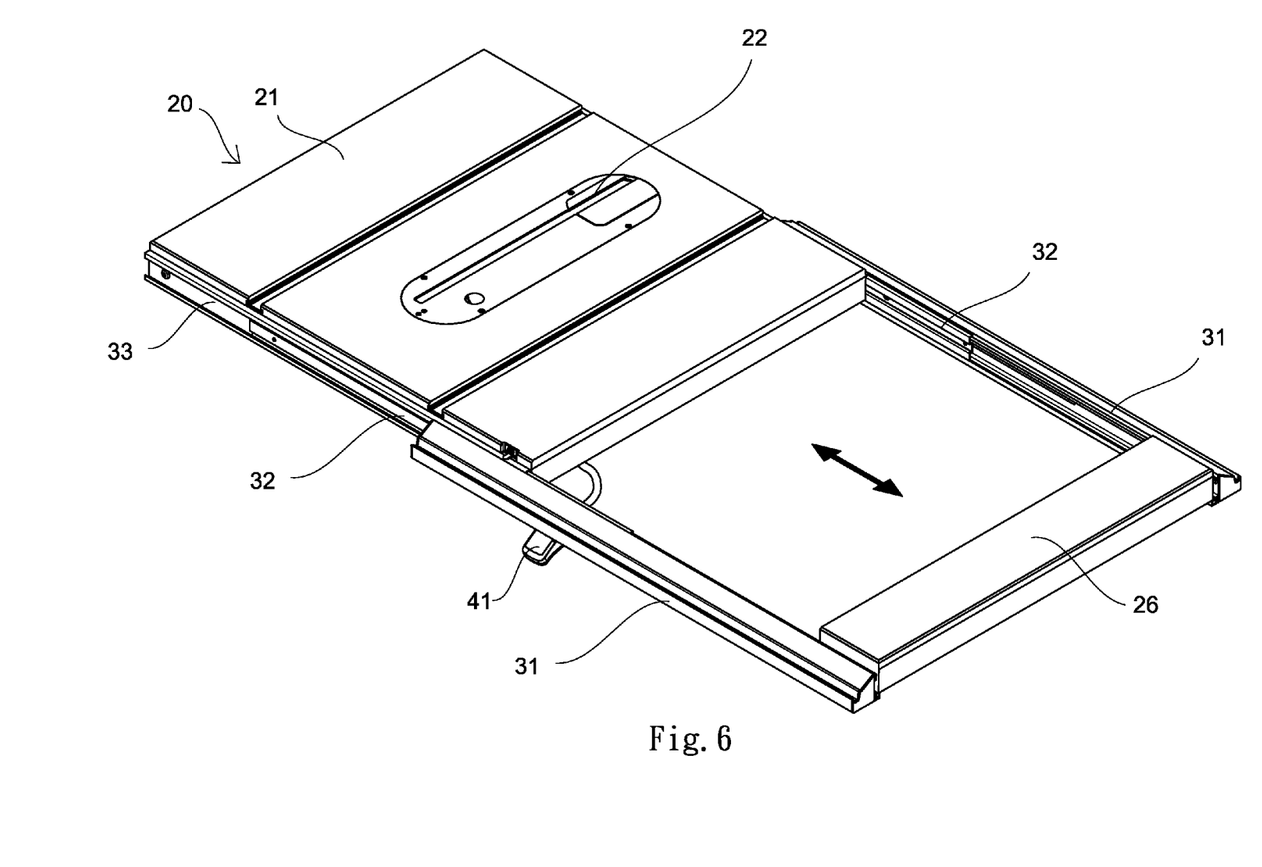
FIG. 6 is a view similar to FIG. 2 showing the upper cutting surface being expanded by outwardly moving along the rails.
Figure 7:
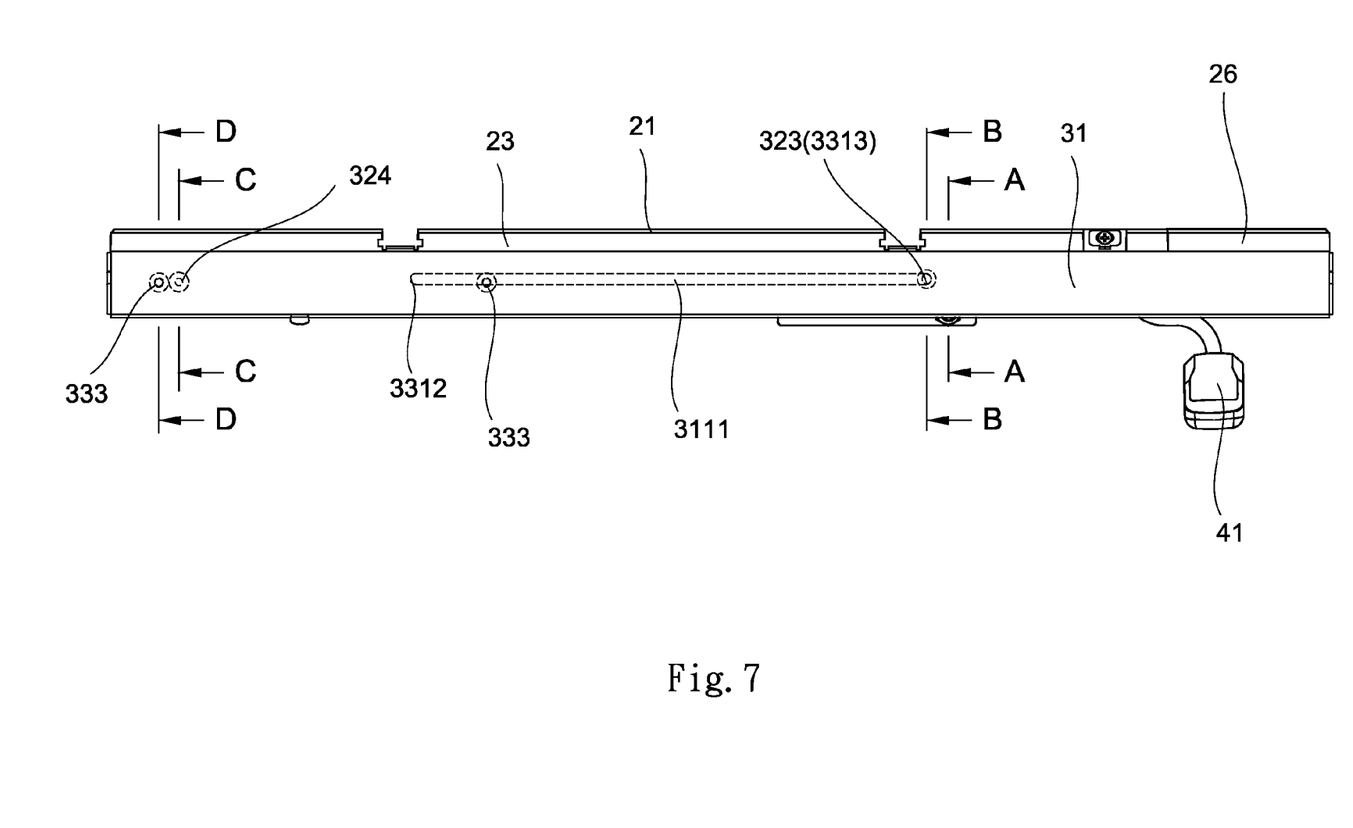
FIG. 7 is a front view of FIG. 2.
Figure 8:
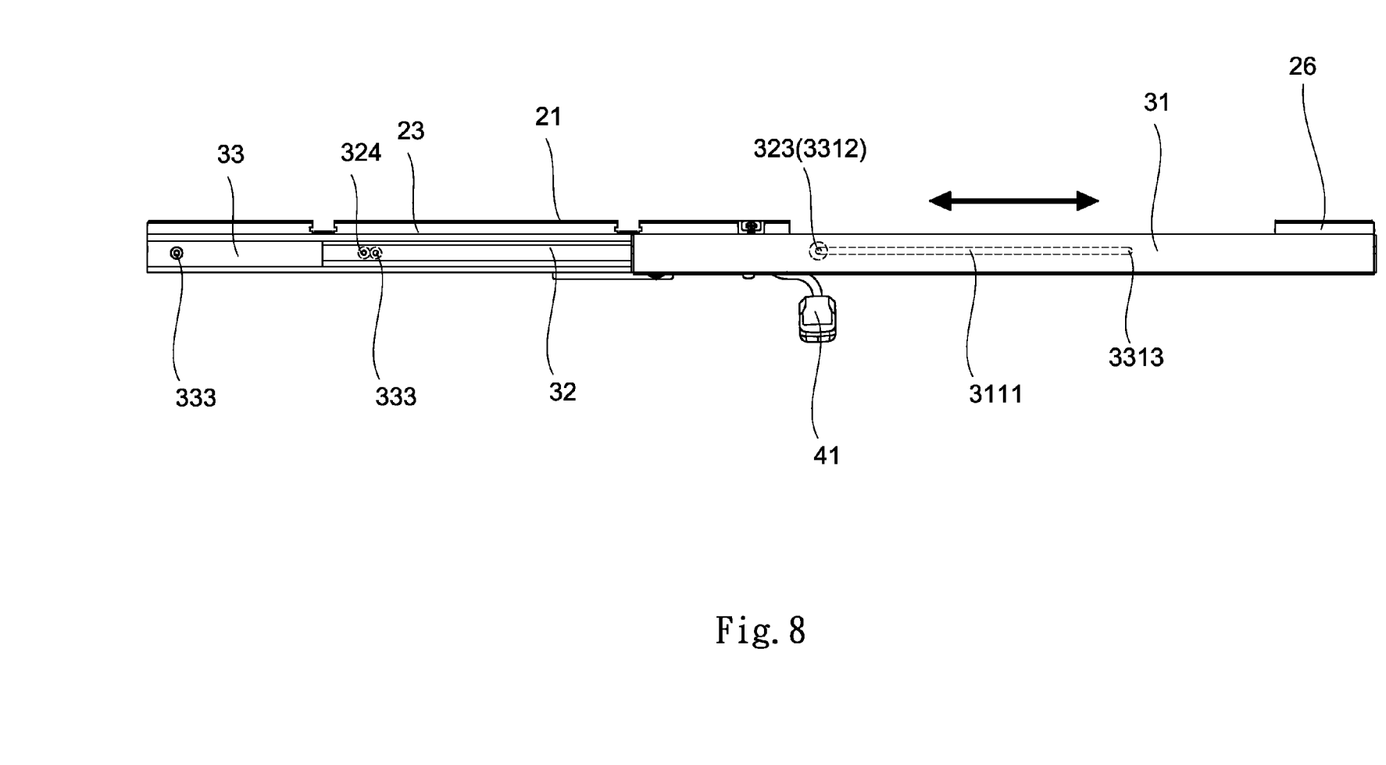
FIG. 8 is a front view of FIG. 6.

A frame 12 and a table assembly 20 mounted on the frame 12 are provided. The table assembly 20 includes an upper cutting surface 21 on which a material, such as wood, is placed to be cut by a blade 221; and an auxiliary table 26 at one side of the table assembly 20 besides the upper cutting surface 21. As shown, the blade 221 extends through an opening 22 in the upper cutting surface 21. As known to those skilled in the art, the table saw 10 further includes a motor (not shown) that rotates the blade 221 at a sufficient speed so that the blade 221 cuts the material. The table assembly 20 further comprises a rip fence 25 on the auxiliary table 26 to assist in the cutting of the material.

A slide assembly 30 includes, at each of front edge 23 and rear edge 24 of the upper cutting surface 21, an outer slide member 31, an intermediate slide member 32, and an inner slide member 33. The outer slide member 31 has one end secured to the auxiliary table 26 and includes an inner wall 311, an elongated slot 3111 in the inner wall 311, first lips 312, first lipped channels 313 each formed by the first lip 312, a second lip 314 under the lower one of the first lips 312, and a second lipped channel 315 formed by the second lip 314. The intermediate slide member 32 includes third lips 321, a third lipped channel 322 formed by the third lips 321, a limiting member 326 for preventing the intermediate slide member 32 from being pulled out of the slide assembly 30 and decreasing a distance between the intermediate slide member 32 and the inner slide member 33, and a pin 323 secured to a hole 324 and configured to move between a first end 3312 of the elongated slot 3111 in the outer slide member 31 and a second end 3313 of the elongated slot 3111 in the outer slide member 31. The inner slide member 33 includes fourth lips 331, a fourth lipped channel 332 formed by the fourth lips 331, and fasteners 333 for securing the inner slide member 33 to the front edge 23 (or the rear edge 24) of the upper cutting surface 21, and the limiting member 326 of the intermediate slide member 32 is configured to slide between the two fasteners 333 of the inner slide member 33. The outer slide member 31 is slidably journalled in the intermediate slide member 32 and the intermediate slide member 32 is slidably journalled in the inner slide member 33. The fourth lip 331 and the third lip 321 are complementarily engaged with the first lipped channel 313, and the second lipped channel 315 and the fourth lips 331 are complementarily engaged. The fourth lipped channel 332 and the third lip 321 are complementarily engaged, and the third lipped channel 322 and the first lips 312 are complimentarily engaged.

A lock assembly 40 is mounted on an underside of the upper cutting surface 21 by driving a plurality of fasteners (not numbered) through a plurality of mounting members 47 into a plurality of holed members 211 on an under side of the upper cutting surface 21. The lock assembly 40 comprises a lever 41, a cam 42 mounted at a distal end of the lever 41, and a two part rod 43 including a first rod 431 having a first end 4311 engaged with the cam 32 and a second end 4312; and a second rod 432 having a first end 4321 engaged with the cam 32 and a second end 4322, i.e., the cam 32 being pivotably disposed between the first rod 431 and the second rod 432 of the two part rod 43. The lock assembly 40 further comprises, at a location proximate the slide assembly 30 at the front edge 23 (or the rear edge 24) of the upper cutting surface 21, a bracket 44 having a holed plate 446 and a peg 445 through the holed plate 446 to secure the bracket 44 to the underside of the upper cutting surface 21, the bracket 44 being capable of pivoting about the peg 445, a holed enlargement 433 frictionally put on the first rod 431 (or the second rod 432) and urging against the bracket 44, a torsion spring 45 biased between the bracket 44 and the front edge 23 (or the rear edge 24) of the upper cutting surface 21, and a shaft 46 having one end 461 slidably terminated in the bracket 44 and the other end 462 engaged with the second lip 314. The second end 4312 of the first rod 431 (or the second end 4322 of the second rod 432) proximate the slide assembly 30 urges against a groove 325 of the intermediate slide member 32 after passing through a hole 241 of the rear edge 24 (or a hole 231 of the front edge 23) and a hole 334 of the inner slide member 33. For example, a fastener is driven through the bracket 44 into a mounting member 241 on an inner surface of the rear edge 24 to fasten the bracket 44 and the rear edge 24 together.

Figure 10:
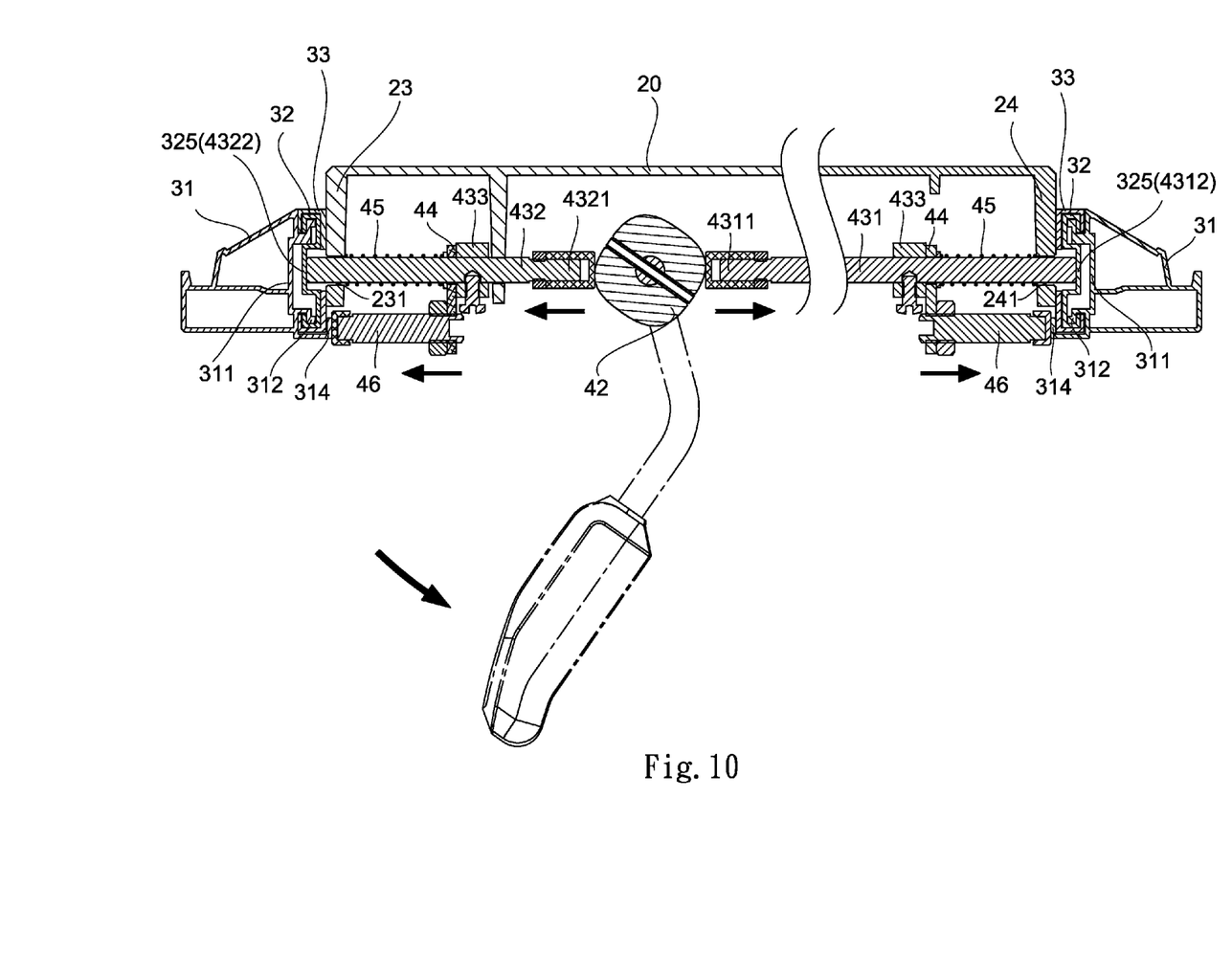
FIG. 10 is a longitudinal sectional view of the table saw showing a counterclockwise rotation of the lever and movements of other components thereafter.
Figure 10A:
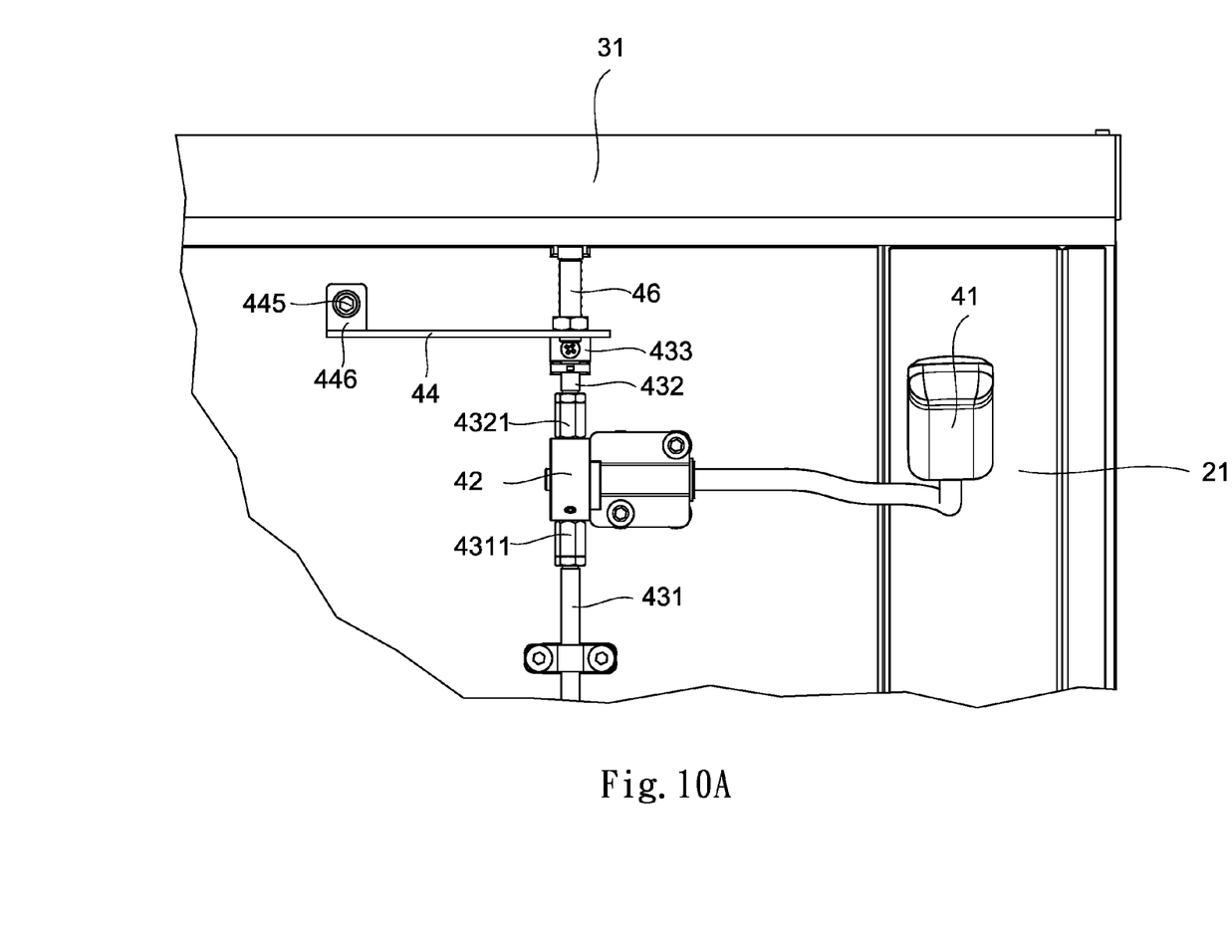
FIG. 10A is a view similar to FIG. 9A showing the position of the lever shown in FIG. 10.
Figure 10B:
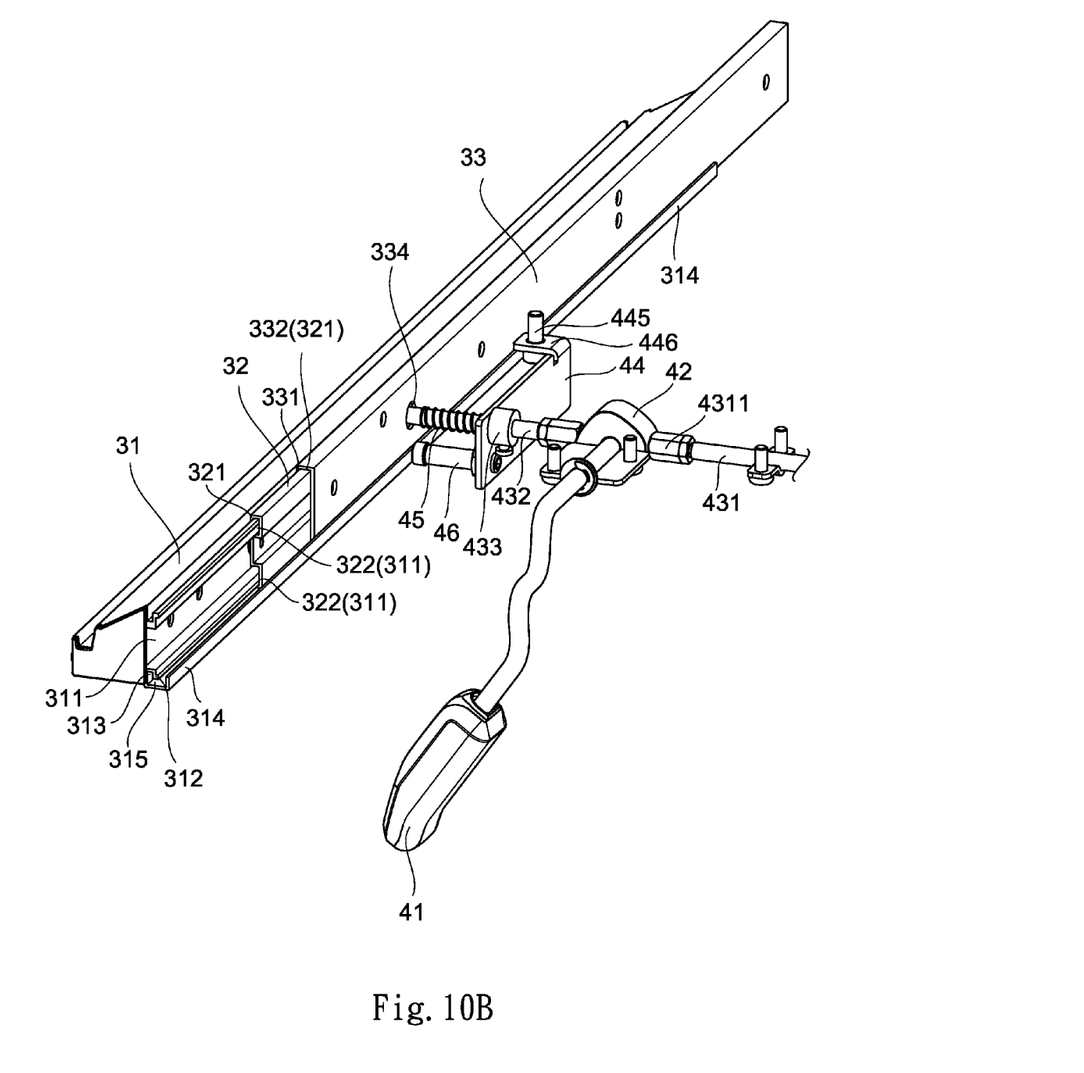
FIG. 10B is a view similar to FIG. 9B showing the positions of the lever shown in FIG. 10.
Figure 11:
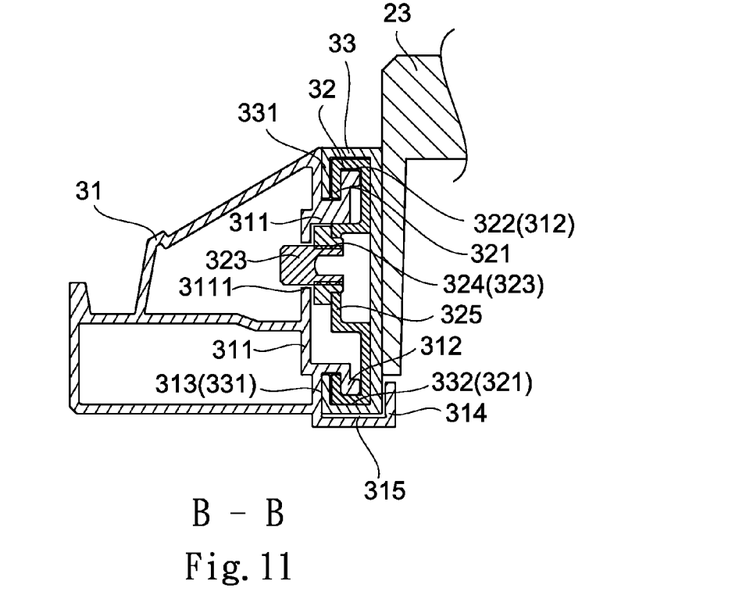
FIG. 11 is a sectional view taken along line B-B of FIG. 7.
Figure 12:
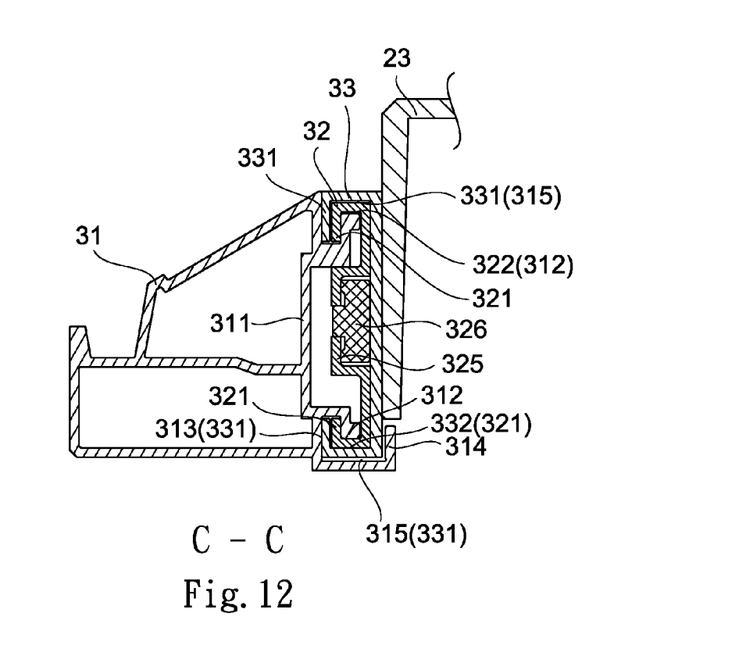
FIG. 12 is a sectional view taken along line C-C of FIG. 7.
Figure 13:
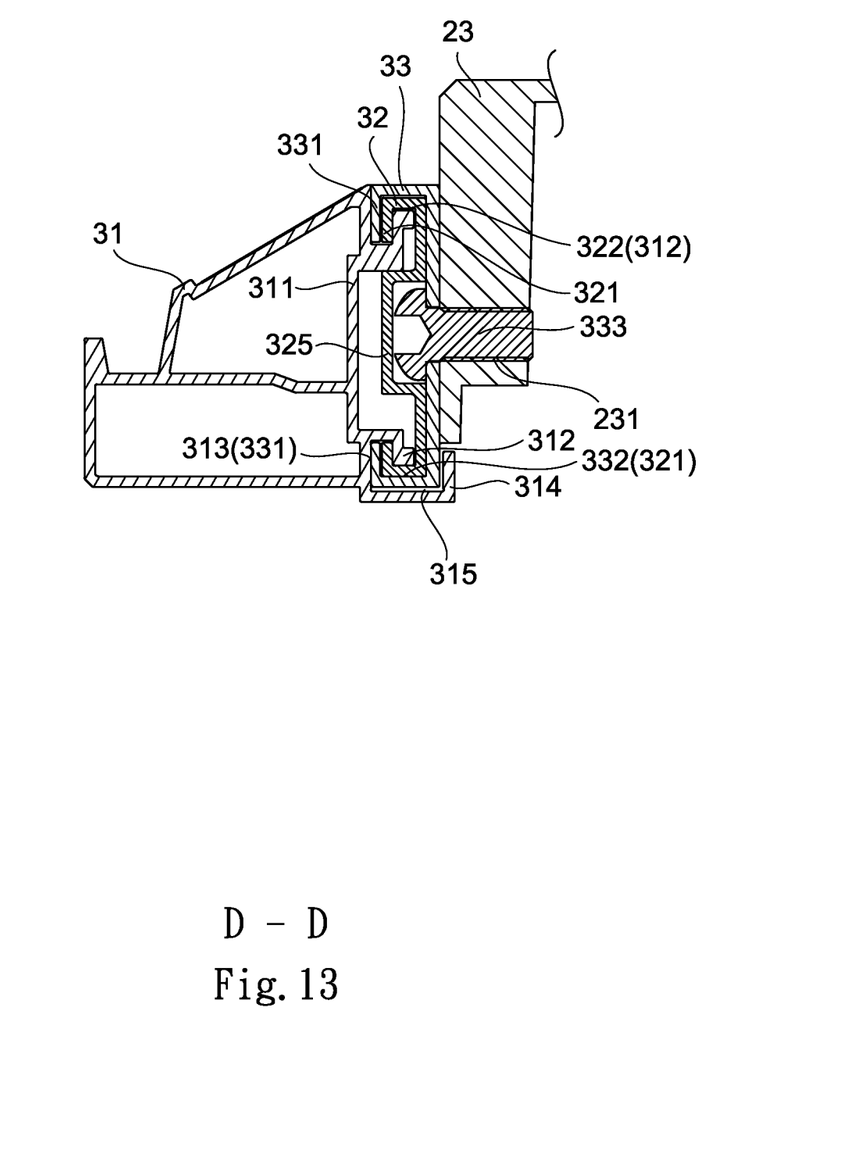
FIG. 13 is a sectional view taken along line D-D of FIG. 7.

As shown in FIG. 10, a user may counterclockwise turn the lever 41. And in turn, the cam 42 rotates to push the outer ends of the rod 43 outward until the outer ends of the rod 43 urge against the grooves 325 of the intermediate slide members 32 (i.e., both outer slide members 31 and the intermediate slide members 32 are secured in place). At the same time, the bracket 44 slidably moves along the shaft 46. In detail, the holed enlargement 433 pushes the bracket 44 to move toward the front edge 23 (or the rear edge 24), and the shaft 46 urges against the outer slide member 31 in the locked position. Also, the spring 45 is compressed. As a result, the slide assembly 30 is locked and the upper cutting surface 21 is disposed in a first position for material cutting operation to be performed.

Figure 9:
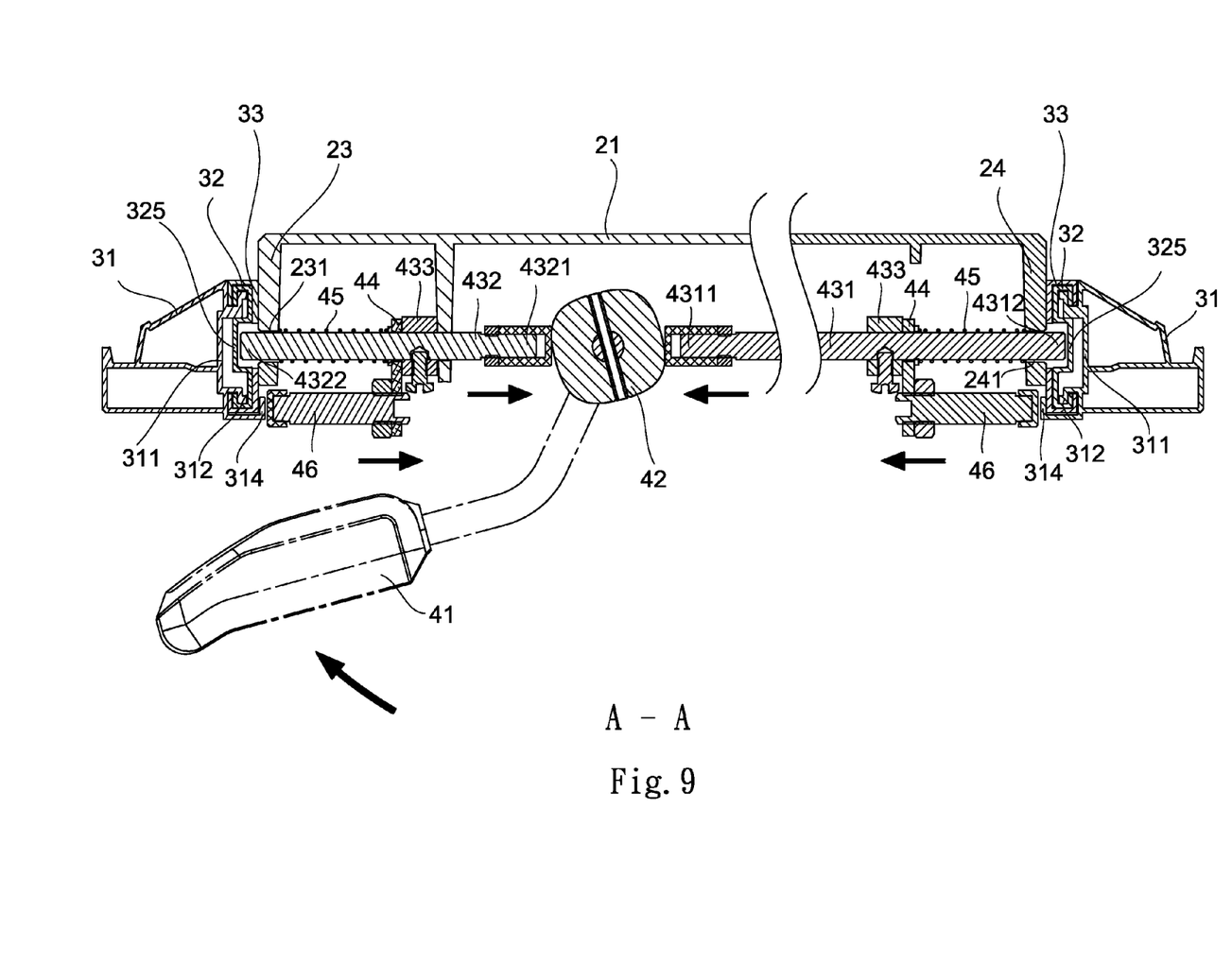
FIG. 9 is a sectional view taken along line A-A of FIG. 7.
Figure 9A:
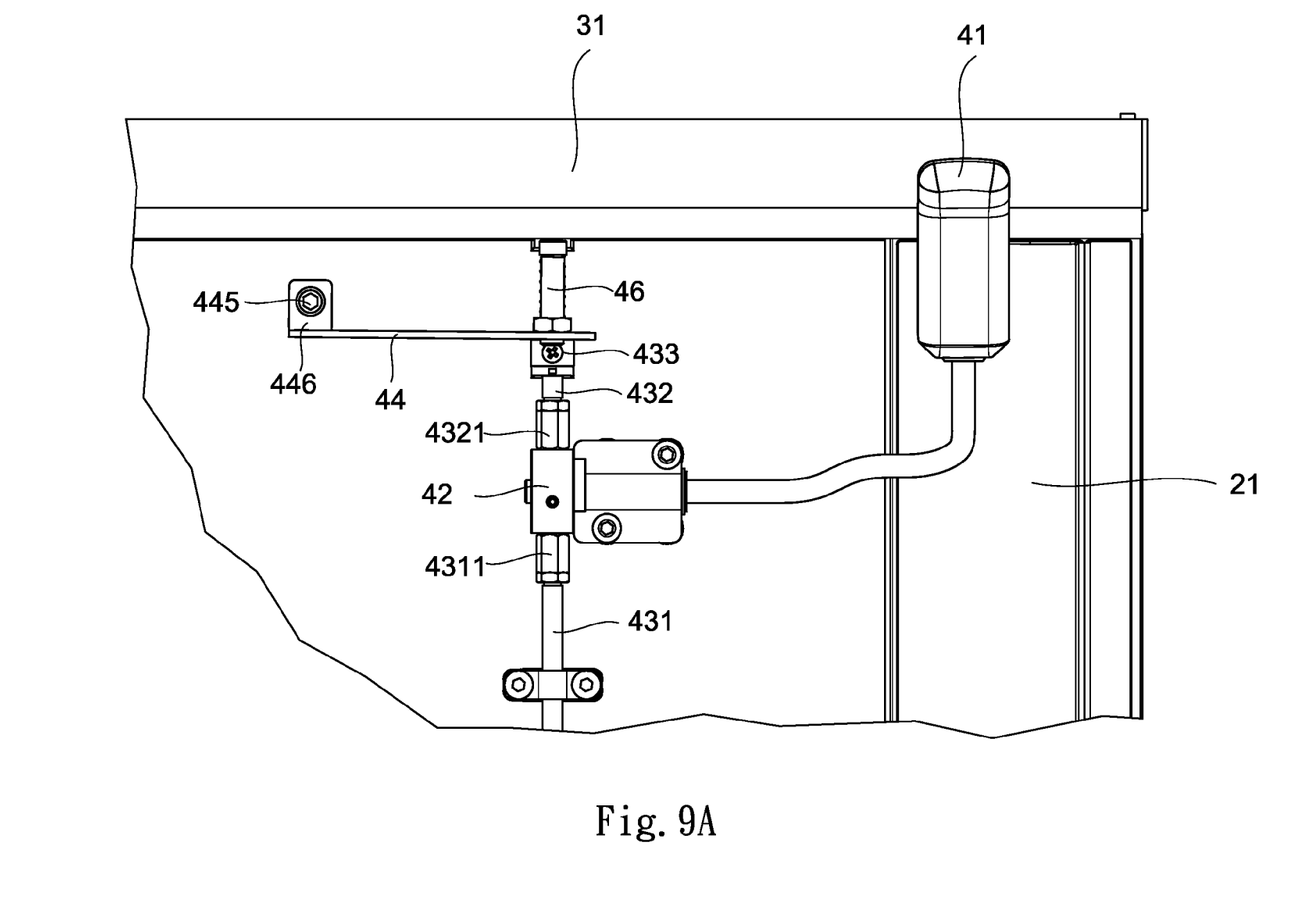
FIG. 9A is a fragmentary view of FIG. 4 showing the lever and adjacent components.
Figure 9B:
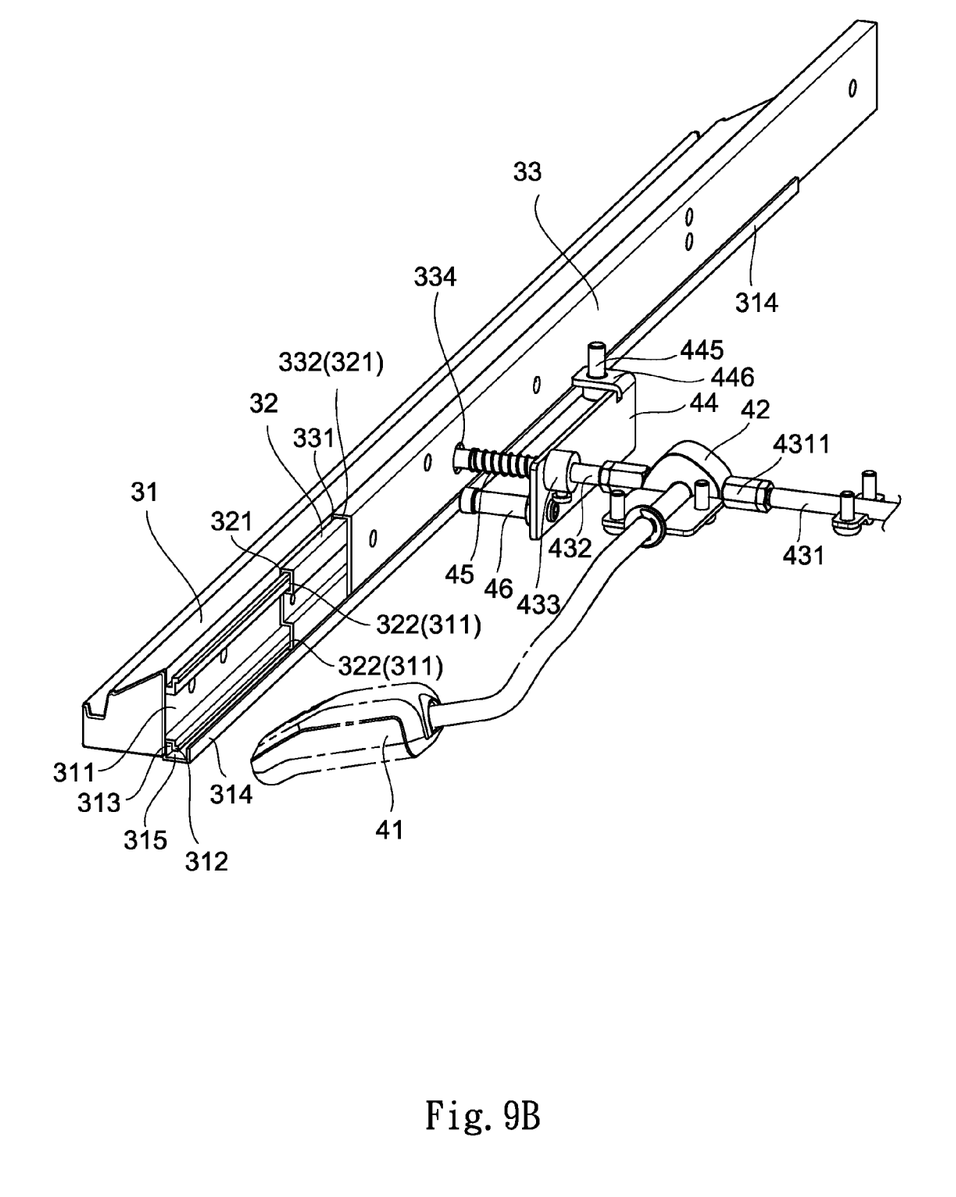
FIG. 9B is a perspective view of the lever and adjacent components.

As shown in FIG. 9, the user may clockwise turn the lever 41. And in turn, the cam 42 rotates in a direction opposite to that of the cam 42 shown in FIG. 10. And in turn, the spring 45 expands to push the bracket 44 away from the front edge 23 (or the rear edge 24), and the holed enlargement 433 pushes each of the first and second rods 431, 432 of the two part rod 43 inward. Thus, the outer ends of the rod 43 disengage from the grooves 325 of the intermediate slide members 32. At the same time, the bracket 44 slidably moves along the shaft 46. As a result, the slide assembly 30 is unlocked, both the intermediate and outer slide members 32, 31 can move relative to the inner slide member 33 for expanding the upper cutting surface 21, and the upper cutting surface 21 is disposed in a second position for material cutting operation to be performed.

It is noted that the pin 323 can move between the first end of the slot 3111 in the outer slide member 31 and the second end of the slot 3111 in the outer slide member 31 when the upper cutting surface 21 changes from the first position to the second position (or from the second position to the first position). Moreover, the pin 323 may dispose in any position between the first position and the second position and also be locked so that a subsequent material cutting operation can be done.

While the invention has been described in terms of preferred embodiments, those skilled in the art will recognize that the invention can be practiced with modifications within the spirit and scope of the appended claims.

What is claimed is:

1. A table saw comprising:
   a table assembly mounted on a frame and including an upper cutting surface through which a blade extends to cut a material, the upper cutting surface having a front edge and a rear edge extending between a first side and a second side; and an auxiliary table at one side of the upper cutting surface; and
   a slide assembly including, at each of the front edge and the rear edge of the upper cutting surface, an inner slide member, an intermediate slide member slidably journaled in the inner slide member, and an outer slide member slidably journaled in the intermediate slide member;
   wherein the outer slide member has one end secured to the auxiliary table and includes an inner wall, a slide slot in the inner wall, a first lip, a first lipped channel formed by the first lip, a second lip under the first lip, and a second lipped channel formed by the second lip;
   wherein the intermediate slide member includes a third lip, a third lipped channel formed by the third lip, and a limiting member for preventing the intermediate slide member from being pulled out of the slide assembly and decreasing a distance between the intermediate slide member and the inner slide member;
   wherein the inner slide member includes a fourth lip and a fourth lipped channel formed by the fourth lip;
   wherein the fourth lip and the third lip are complementarily engaged with the first lipped channel, the second lipped channel and the fourth lip are complementarily engaged, the fourth lipped channel and the third lip are complementarily engaged, and the third lipped channel and the first lip are complimentarily engaged;
   wherein the intermediate slide member includes a pin moveably disposed in the slide slot, the pin being configured to move between a first end of the slide slot and a second end of the slide slot; and
   wherein the inner slide member further comprises two fasteners for securing the inner slide member to the front edge or the rear edge of the upper cutting surface.

* * * * *